United States Patent [19]
Sakurai et al.

[11] Patent Number: 5,720,259
[45] Date of Patent: Feb. 24, 1998

[54] FUEL INJECTED MULTI-VALVE ENGINE

[75] Inventors: Kenichi Sakurai; Makoto Kawamura, both of Iwata, Japan

[73] Assignee: Yamaha Hatsudoki Kabushiki Kaisha, Iwata, Japan

[21] Appl. No.: 670,656

[22] Filed: Jun. 26, 1996

[30] Foreign Application Priority Data

Jun. 26, 1995 [JP] Japan ................................ 7-183390

[51] Int. Cl.[6] ............................................. F02B 15/00
[52] U.S. Cl. ................................... 123/432; 123/308
[58] Field of Search ................................ 123/432, 442, 123/308

[56] References Cited

U.S. PATENT DOCUMENTS

| 4,550,699 | 11/1985 | Okumara et al. | 123/308 |
| 4,726,341 | 2/1988 | Muranaka et al. | 123/432 |
| 5,119,784 | 6/1992 | Hashimoto et al. | 123/432 |
| 5,329,912 | 7/1994 | Matsumoto et al. | 123/432 |

FOREIGN PATENT DOCUMENTS

| 4108469 | 9/1991 | Germany. |
| 4233640 | 4/1993 | Germany. |
| 4439918 | 5/1995 | Germany. |
| 0390589 | 10/1990 | Japan. |

OTHER PUBLICATIONS

European Search Report dated Oct. 1996.

*Primary Examiner*—Noah Kamen
*Attorney, Agent, or Firm*—Knobbe, Martens, Olson & Bear LLP

[57] ABSTRACT

A multi-valve manifold injected internal combustion engine. The fuel injector has a spray pattern that is directed primarily toward each of the intake valve seats. An air control system is incorporated, however, that directs the airflow primarily toward the center intake valve seat under some running conditions so as to improve fuel stratification.

15 Claims, 3 Drawing Sheets

FUEL INJECTED MULTI-VALVE ENGINE

BACKGROUND OF THE INVENTION

This is invention relates to a fuel injected multi-valve engine and, more particularly, to an improved arrangement for controlling fuel distribution in such an engine.

It has been acknowledged that the performance of an engine can be significantly improved by improving its breathing capacity. This can be accomplished either by using a single large intake valve or a plurality of smaller intake valves. The latter approach is more favored because the use of a larger number of smaller valves reduces the individual inertia on the valves and permits faster opening and closing and, hence, better breathing and higher engine speeds. As a result, performance can be significantly improved through the use of multiple intake valves.

Although many high performance engines employ two intake valves per cylinder, the advantages of the utilization of even more, such as three intake valves, have been recognized. However, when utilizing three intake valves or, in fact, when utilizing multiple intake valves, care must be taken to ensure that engine low speed and mid-range performance is not deteriorated.

In order to achieve high maximum power outputs, it is desirable that the air flow into the combustion chamber be relatively smooth and undisturbed. This reduces restrictions in the intake charge flow and provides high volume metric efficiencies and, accordingly, high power outputs. However, when running at low engine speeds and loads and in mid-range, the large unrestricted flow area of the multiple intake passages presents some problems. That is, the slow flow of the charge into the combustion chamber results in the lack of any significant turbulence. Thus, combustion is relatively slow under these running conditions and, because of this slow speed, may not be complete.

Therefore, arrangements have been provided wherein the flow through one or more of the intake passages is restricted under some running conditions such as low speed, low load. This increases the velocity of the air flow into the combustion chamber and the resulting turbulence accelerates flame propagation and ensures complete combustion.

With the use of such multiple intake valves and control flow arrangements, an additional problem arises, however. This deals with the fuel supply for the engine. Fuel injection systems have been utilized widely because of their more accurate fuel control. However, when multiple intake valves are employed and manifold injection is utilized, then the fuel injector must be disposed so as to spray the fuel into the intake system in such a pattern that there will be good fuel distribution in the combustion chamber. However, when the flow pattern to the combustion chamber is altered by controlling or restricting the flow through one or more of the intake passages, then the distribution of fuel from the fuel injector presents a problem.

For example, if an engine is provided with three intake valves, one center intake valve, and a pair of side intake valves, in order to assure good fuel distribution under high-speed/high load conditions, the injector should have either a relatively large spray axis or should have a plurality of discharge nozzles directed toward the individual intake ports. This assumes, of course, the use of a single fuel injector. Of course, the use of multiple fuel injectors can present one solution to this problem but the use of multiple fuel injectors significantly increases the cost of the engine. In addition, the positioning and supply of fuel to multiple injectors for each cylinder raises additional problems.

Therefore, it is desirable to employ an single injector even when multiple valves are employed. Thus, the foregoing distribution problem arises.

It is, therefore, a principal object of this invention to provide an improved manifold-type fuel injection system for a multi-valve engine wherein a simple injector can be employed and yet its spray pattern controlled in response to engine running conditions.

It is a further object of this invention to provide an improved multi-valve engine and fuel injection system for it wherein the fuel spray can be controlled depending upon running conditions in a relatively simple and expeditious manner.

SUMMARY OF THE INVENTION

This invention is adapted to be embodied in an internal combustion engine having a combustion chamber served by at least three intake ports. These intake ports are comprised of a center intake port that is disposed further from the cylinder bore axis along a line extending perpendicular to that axis. A pair of side intake ports are disposed on opposite sides of the center intake port. A single intake passage having a common inlet and three branched outlets serves the respective intake ports. A fuel injector is mounted in the intake system and sprays into the common portion along a spray pattern that is configured so as to direct the fuel spray toward each of the intake ports. An air assist system is provided that is operative to redirect the fuel spray from the fuel injector primarily toward only one of the intake ports under at least some running conditions.

BRIEF DESCRIPTION OF THE DRAWINGS

FIG. 2 is a cross-sectional view of the top-most portion of the engine taken along a plane that extends through the center intake port on the intake side of the engine and through a plane that extends through one of the exhaust ports on the exhaust side of the engine.

DETAILED DESCRIPTION OF THE PREFERRED EMBODIMENT OF THE INVENTION

Figure 1:
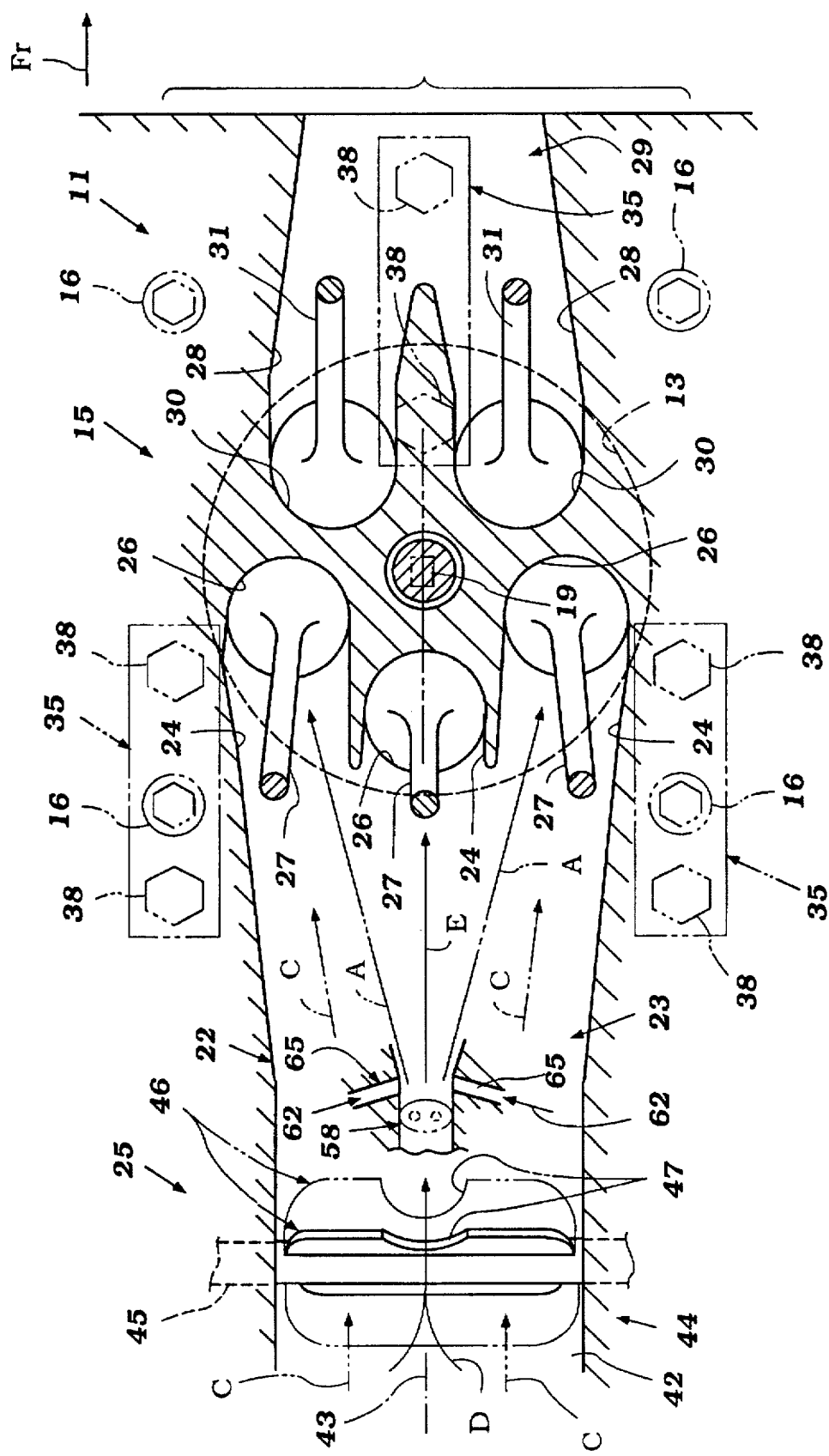
FIG. 1 is a cross-sectional view of a portion of an engine constructed in accordance with an embodiment of the invention with portions of the engine shown in phantom.
Figure 2:
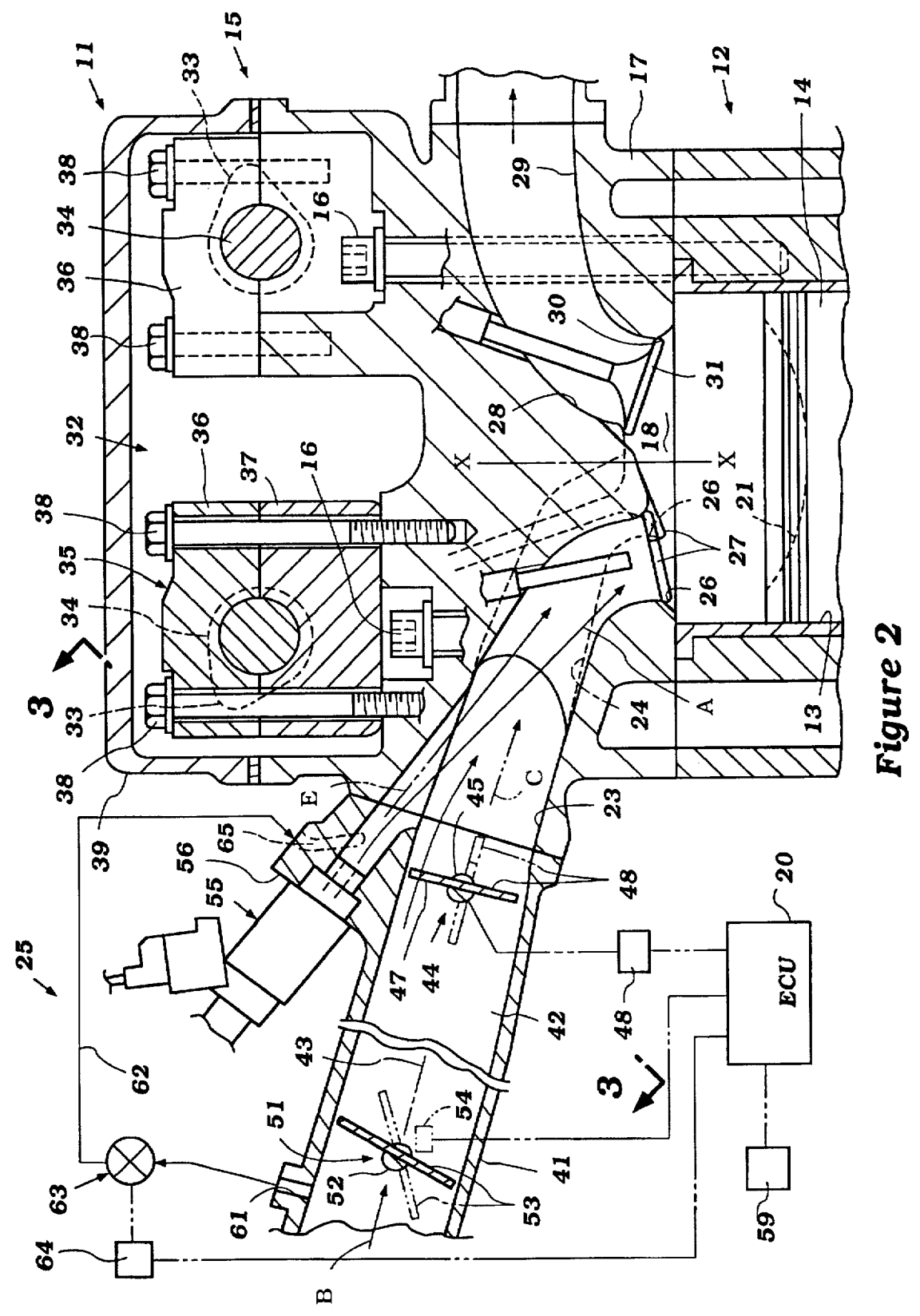

Referring now to the drawings and initially to FIGS. 1 and 2, the uppermost portion of a four-stroke, internal combustion engine constructed in accordance with an embodiment of the invention is indicated by the reference numeral 11. The engine 11 may be of any type configuration such as an inline type or V-type engine and may have any number of cylinders.

The engine 11 is provided with an engine body or cylinder block 12 to which is affixed at its lower end by any suitable means a crankcase member (not shown) which contains the crankshaft for the engine 11. A cylinder bore 13 is formed within the cylinder block 12 and in which a piston 14 reciprocates. The piston 14 is pivotally connected to the small end of a connecting rod (not shown) which in turn is journaled at its lower end to a throw of a crankshaft (not shown). As already noted, the crankshaft is rotatably journaled within the crankcase member.

A cylinder head assembly indicated by the reference numeral 15 is affixed to the upper surface of the cylinder block 12 by head bolts 16 which, as best seen in FIG. 1, are uniformly distributed around the cylinder bore 13 and extend through a cylinder head body 17 to threadingly engage the upper end of the engine block 12. The cylinder head 15 has a recess 18 formed in its lower surface above which is positioned a spark plug 19. The spark plug 19 has its gap extending into the recess 18 and is fired by an ignition system (not shown) that is controlled by an electronic control unit or ECU 20.

The recess 18 is aligned with the cylinder bore 13 and a bowl 21 in the head of the piston 14 to form a lens-shaped combustion chamber for the engine 11. The recess 18 can be referred to as a combustion chamber since at top-dead center (TDC) its volume comprises the major portion of the clearance volume.

An intake passage 22 extends through one side of the cylinder head 15 and is provided with a common section 23 at its outer end from which extends rearwardly a trio of Siamesed passages 24. The middle passage 24 is henceforth referred to as the center intake passage and the remaining two passages 24 are referred to as side intake passages. The intake passage 22 is served by an induction system that is indicated by the reference numeral 25 and will be described in detail later. The center and side intake passages 24 terminate at their inner ends at a trio of intake ports 26 which are each controlled by respective intake valves 27.

The intake ports 26 are disposed in the combustion chamber 18 so that the center port 26 is disposed on a plane passing through the axis X of the cylinder bore 13 and perpendicular to the rotational axis of the crankshaft. This plane is the same as the intake side plane of FIG. 2. The side intake ports 26 are disposed on opposite sides of this plane and are intercepted by a second plane containing the cylinder bore axis X and perpendicular to the first-mentioned plane.

A pair of Siamesed exhaust passages 28 extends through the opposite side of the cylinder head 15 and open to a single exhaust passage 29. The exhaust passages 28 originate at respective exhaust ports 30 which are controlled by a pair of exhaust valves 31.

The intake and exhaust valves 27 and 31, respectively, are operated by buckettype tappets (not shown) of a valve train assembly that is indicated by the reference numeral 32. The valve train assembly 32 is comprised of valve springs (not shown) which hold the respective valves closed. The valves 27 and 31 are opened by cam lobes 33 of respective cam shafts 34 through the tappets. The overhead cam shafts 34 are journaled for rotation in the cylinder head 15 by bearing cap assemblies that are indicated by the reference numeral 35 and pivotally journal the cam shafts 34 between upper and lower bearing housings 36 and 37, respectively. Bolts 38 extend through the ends of the housings 36 and 37 and threadingly engage the cylinder head body 17.

As can best be seen in FIG. 2, the intake cam shaft 34 is positioned directly above one of the cylinder head bolts 16 and over the bore 13 while the exhaust cam shaft 34 is positioned somewhat outwardly from its associated head bolt 16 and away from the bore 13. This unsymmetric cam shaft alignment is necessary in order to dispose the three intake valves 27 within the cylinder head 15 in a manner which produces the optimum intake charge flow characteristics while still allowing all three intake valves 27 to be operated upon by the single intake cam shaft 34.

The cam shafts 34 are driven at one-half engine speed from the crankshaft by any known type of drive. The valve actuating mechanism described is fully enclosed by a cam cover 39 that is fixed to the cylinder head 15 in any known manner.

It is commonly known in the art that utilization of multiple intake valves improves the breathing capacity and thus the performance of an engine. Engines of such configuration do have a problem, however, in that they tend to produce inefficient combustion under low-speed/low-load operating conditions. This inefficiency is a result of the low intake charge velocity into the engine's combustion chambers under such operating conditions that causes slow flame propagation. It is therefore desirable to provide an induction system that ensures that the air entering the combustion chamber is at a velocity sufficiently high so as to maintain high engine combustion efficiency even under low-speed/low-load operating conditions.

Such an induction system 25 is provided with the present embodiment and will now be discussed in detail with continued reference to FIGS. 1 and 2. The induction system 25 is composed of an intake control valve body 41 in which is formed an induction passage 42 with a generally rectangular section. The inner end of the intake control valve body 41 is affixed by any suitable means to the intake side of the cylinder head 15 such that the induction passage 42 opens to the common portion 23 of the intake passage 22. The outer end of the intake control valve body 41 is affixed to an intake manifold (not shown) which delivers a supply of atmospheric air through the induction passage 42 to the combustion chamber 18.

The axis of the induction passage 42 is in alignment with the axis of the center intake passage 22 which is henceforth referred to as the flow axis and indicated by the reference numeral 43. A butterfly-type control valve assembly 44 is pivotally journaled within the intake body 41 and consists of a valve shaft 45 to which is mounted a valve 46 with an opening 47 formed at the top of the center portion of the valve 46 for a reason to be described. The control valve assembly 44 is operated by an actuator 48 which is controlled by the ECU 20.

A single, manually-operated throttle valve assembly 51 is pivotally journaled within the induction passage 42 upstream of the control valve assembly 44. The throttle valve assembly 51 consists of a shaft 52 which extends transversely across the intake control valve body 41 and to which is affixed a valve 53. A throttle angle position sensor 54 is associated with the throttle valve 51 and outputs a signal that is indicative of the engine load to the ECU 20.

A fuel injector is indicated by the reference numeral 55 and mounted to a boss portion 56 of the intake body 41 along the plane that contains the center intake port 26. With additional reference now to FIG. 3, the fuel injector 55 includes a pair of spray nozzles 57 that discharge to an injection passage 58 which in turn opens to the intake passage 22 upstream of the point at which the passages 24 separate.

As best seen in FIG. 1, the nozzles 57 operate so as to spray the injected fuel downwardly and outwardly towards the intake passages 24 along paths bounded by the arrows A which thus assures that the fuel is directed through each of the intake ports 26 into the combustion chamber 18. The operation of the fuel injector 55 is controlled by the ECU 20.

As previously stated the ECU 20 controls the operation of the spark plug 19, control valve 44, and fuel injector 55 so as to provide the optimum engine performance for the given engine running conditions. These running conditions are signalled to the ECU 20 by a series of sensors. The sensors include the throttle position sensor 54 which, as previously discussed, outputs a signal indicative of the engine load to the ECU 20. Additionally, an engine speed sensor is indicated by the reference numeral 59 and associated with the crankshaft of the engine. The engine speed sensor 59 outputs a signal indicative of the engine speed in revolutions per minute (rpm) to the ECU 20.

Based on the signals from the above two sensors, the ECU 20 determines the optimum fuel injection pulse time and duration and the ignition timing for the engine 11 though it is to be understood that signals from other sensors may also be utilized by the ECU 20 and output signals that are indicative of other engine running or ambient conditions.

The ECU 20 also controls the operation of the control valve 44 so as to maintain high engine efficiency even when the engine 11 is operating under low-speed/low-load operating conditions. During an intake stroke for the engine 11, the piston 14 moves downwards and produces a negative pressure inside the combustion chamber 18. This draws atmospheric air through the induction system 25 along the path that is indicated by the arrow B parallel to the flow axis 43. The air is then drawn past the throttle valve 51 and control valve 44 along the path indicated by the arrow C when the control valve 44 is in its opened position as is shown in phantom.

The air then mixes with fuel from the fuel injector 55 whose pulse timing and duration is controlled by the ECU 20. The air/fuel charge then flows into the intake passages 24 and past the open intake valves 27 into the combustion chamber 18, there to be ignited by the spark plug 19 whose firing is controlled by the ECU 20.

When the engine 11 is operating at a low-speed or load condition, the ECU 20 signals the actuator 48 which closes the control valve 44 and thus precludes induction charge flow through the intake passage 22 except for through the center intake passage 24 as indicated by the arrow D since the induction charge flow may readily pass through the center intake passage 24 through the opening 47 formed in the central top portion of the control valve 46. This reduces the effective area of the induction system 25 which causes the induction charge flow velocity to increase substantially. This in turn increases the engine's performance and efficiency for low-speed/low-load operation.

The engine performance under low-speed/low-load operating conditions is further improved by the disposition of the opening 47 on the control valve 46 which in addition to providing a means by which to increase the intake charge velocity, also tends to redirect the intake charge to one side of the center intake port 26 in such a manner as to produce a tumbling flow in the combustion chamber 18. This rambling flow increases the combustion efficiency of the engine 11 by causing turbulence and thus more rapid flame propagation under low engine speed/low-load operating conditions which further improves the performance and efficiency of the engine 11.

A problem exists, however, with the above-described induction system 25 since under low-speed/low-load operating conditions, the fuel injector 55 will continue to inject much of the fuel through the side intake ports 26 along the paths indicated by the arrows A, even though the intake air flow through these ports is curtailed by the control valve assembly 44 at this time. This means that the air/fuel mixture entering the combustion chamber 18 through the center intake port 26 is extremely lean, which causes the engine 11 to run roughly and with less than optimum performance.

To solve this problem an air flow control means is incorporated by which all the injected fuel is injected towards the center intake port 26 where it mixes homogeneously with the air charge so as to form a suitable stoichiometric mixture in the combustion chamber 18. This invention accomplishes this by using high velocity atmospheric air to force the injected fuel towards the center intake port 26.

Figure 3:
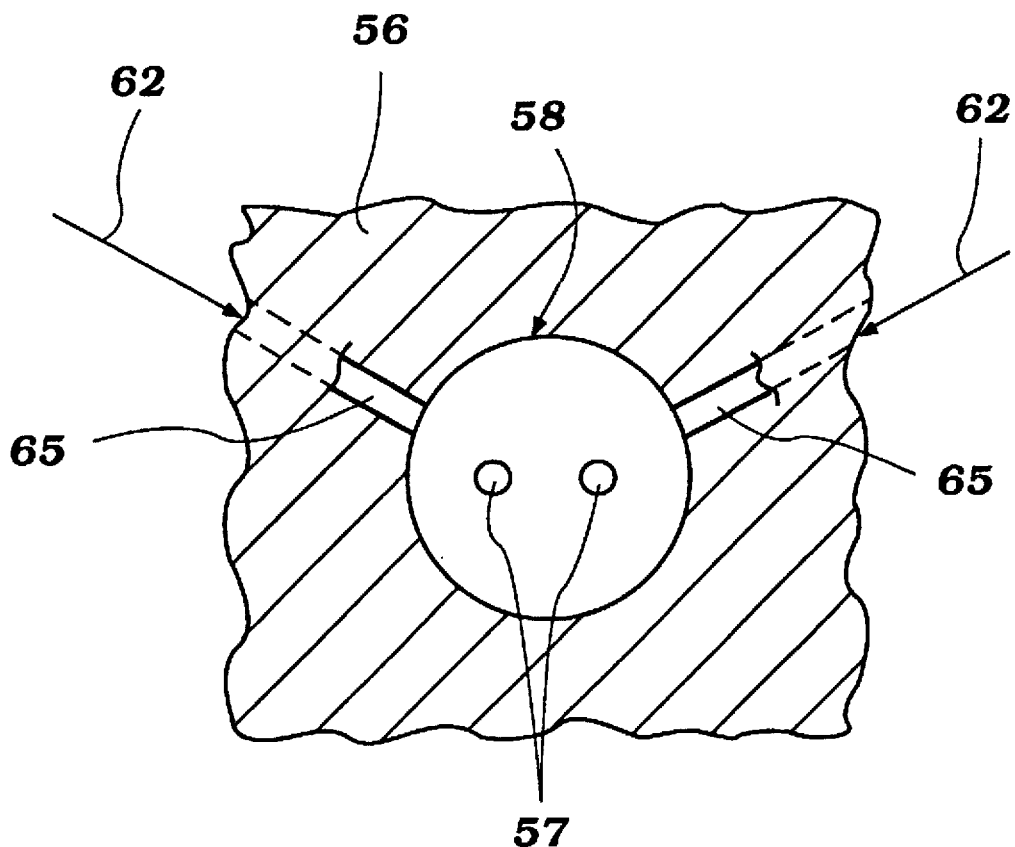
FIG. 3 is a cross-sectional view taken along line 3—3 of FIG. 2 and illustrates the relation of the air assist to the injector nozzle.

As seen in FIG. 2, an opening 61 is provided along the upper surface of the induction passage 41 immediately upstream of the throttle valve assembly 51. The opening 61 serves a conduit 62 which is shown schematically and in which is positioned a servo-valve 63. The servo-valve 63 regulates the amount of air flow through the conduit 62 and is operated by an actuator 64 which is controlled by the ECU 20. The conduit 62 divides and terminates at the fuel injector boss 56 where it opens to a pair of air passages 65 which, as best seen in FIGS. 1 and 3, extend forwardly and downwardly through the boss 56 and open to the injection passage 58 opposite each other and downstream of the nozzle 57. During low-speed/low-load engine operating conditions, the throttle valve 53 is oriented in a near closed position as shown by the solid line valve 53 in FIG. 2. This results in a pressure gradient across the throttle valve 53 with higher, atmospheric-pressure air being present upstream of the throttle valve assembly 51. Some of this high-pressure air is then directed through the opening 61 and into the conduit 62 past the servo-valve 63 which is opened by the actuator 64 an amount determined by the ECU 20 based on the signal from the throttle angle position sensor 54. This air then passes through the air passages 65 and enters the injector passage 58 at high velocity and intercepts and redirects the fuel flow from each of the nozzles 57.

The high velocity air redirects the fuel away from the paths indicated by the arrows A in FIG. 2 and guides the fuel downwardly along the path indicated by the arrow E towards the center intake port 26. Thus, with the above air flow control means, both the air and the fuel are directed through the center intake port 26 under low-speed/low-load operating conditions. This produces a stoichiometric air/fuel mixture within the combustion chamber 18 which results in the engine 11 running smoothly and with optimum performance in low-speed/low-load operating conditions.

It should be readily apparent from the above that the described air flow control means controls the injection of the fuel in a relatively simple manner while assuring optimum engine performance under low speed/low load operating conditions. Of course, the foregoing description is that of preferred embodiments of the invention, and various changes and modifications may be made without departing from the spirit and scope of the invention as defined by the appended claims.

What is claimed is:

1. An internal combustion engine having a combustion chamber, three intake ports serving said combustion chamber, said intake ports comprising a center intake port disposed on a line extending through the axis of the combustion chamber and a pair of side intake ports disposed on the sides of the center intake port and the line connecting it to said center axis of said combustion chamber, an intake passage for supplying air to said intake ports, a throttle valve in said intake passage for controlling the flow therethrough, a fuel injector mounted in said intake passage downstream of said throttle valve and having a spray pattern directed toward each of said intake ports, an air flow control means other than said throttle valve for delivering air that has not flowed past said throttle valve into the path of discharge of fuel from said fuel injector for redirecting the flow of fuel primarily to only one of said intake ports under at least some running conditions.

2. An internal combustion engine as set forth in claim 1, wherein the one intake port is the center intake port.

3. An internal combustion engine as set forth in claim 2, wherein the air flow control means comprises a pair of air passages formed on opposite sides of the discharge from the fuel injector nozzle and means for delivering air under at least atmospheric pressure to said air ports.

4. An internal combustion engine as set forth in claim 1, wherein the throttle valve also restricts the flow to the side intake ports under at least some running conditions.

5. An internal combustion engine as set forth in claim 4, wherein the throttle valve also redirects the flow to one side of the center intake port.

6. An internal combustion engine as set forth in claim 5, wherein the air throttle means is operative when the control valve is in its flow controlling position.

7. An internal combustion engine as set forth in claim 6, wherein the one intake port is the center intake port.

8. An internal combustion engine as set forth in claim 7, wherein the air flow control means comprises a pair of air passages formed on opposite sides of the discharge from the fuel injector nozzle and means for delivering air under at least atmospheric pressure to said air ports.

9. An internal combustion engine having a combustion chamber, three intake ports serving said combustion chamber, said intake ports comprising a center intake port disposed on a line extending through the axis of the combustion chamber and a pair of side intake ports disposed on the sides of the center intake port and the line connecting it to said center axis of said combustion chamber, an intake passage serving said intake ports, a fuel injector mounted in said intake passage and having a spray pattern directed toward each of said intake ports, an air flow control means for delivering air in the path of discharge of fuel from said fuel injector toward said intake ports for redirecting the flow primarily to only said center intake port under at least some running conditions.

10. An internal combustion engine as set forth in claim 9, wherein the air flow control means comprises a pair of air passages formed on opposite sides of the discharge from the fuel injector nozzle and means for delivering air under at least atmospheric pressure to said air ports.

11. An internal combustion engine having a combustion chamber, three intake ports serving said combustion chamber, said intake ports comprising a center intake port disposed on a line extending through the axis of the combustion chamber and a pair of side intake ports disposed on the sides of the center intake port and the line connecting it to said center axis of said combustion chamber, an intake passage serving said intake ports, a fuel injector mounted in said intake passage and having a spray pattern directed toward each of said intake ports, an air flow control means for delivering air in the path of discharge of fuel from said fuel injector toward said intake ports for redirecting the flow primarily to only one of said center ports under at least some running conditions, and control valve means disposed in said intake passage for restricting the flow to the side intake ports under at least some running conditions.

12. An internal combustion engine as set forth in claim 11, wherein the control valve also redirects the flow to one side of the center intake port.

13. An internal combustion engine as set forth in claim 12, wherein the air control means is operative when the control valve is in its flow controlling position.

14. An internal combustion engine as set forth in claim 13, wherein the one intake port is the center intake port.

15. An internal combustion engine as set forth in claim 14, wherein the air flow control means comprises a pair of air passages formed on opposite sides of the discharge from the fuel injector nozzle and means for delivering air under at least atmospheric pressure to said air ports.

* * * * *